United States Patent
De Vecchi

(10) Patent No.: US 6,464,046 B1
(45) Date of Patent: Oct. 15, 2002

(54) PARKING BRAKE ACTUATING MECHANISM

(75) Inventor: Alessandro De Vecchi, Carcare (IT)

(73) Assignee: Automotive Products Italia SpA, Savona (IT)

( * ) Notice: Subject to any disclaimer, the term of this patent is extended or adjusted under 35 U.S.C. 154(b) by 0 days.

(21) Appl. No.: 09/831,964

(22) PCT Filed: Sep. 12, 2000

(86) PCT No.: PCT/IB00/01372

§ 371 (c)(1),
(2), (4) Date: May 16, 2001

(87) PCT Pub. No.: WO01/21976

PCT Pub. Date: Mar. 29, 2001

(30) Foreign Application Priority Data

Sep. 18, 1999 (GB) ............................................ 99 22003

(51) Int. Cl.$^7$ .............................................. F16D 51/00
(52) U.S. Cl. .................... 188/79.55; 188/326; 188/72.9
(58) Field of Search ................................ 188/2 D, 72.9, 188/326, 79.55, 79.59, 325, 328, 106 F, 106 A

(56) References Cited

U.S. PATENT DOCUMENTS

| | | | | |
|---|---|---|---|---|
| 4,753,325 A | * | 6/1988 | Jaksic ........................ | 188/2 D |
| 4,886,134 A | * | 12/1989 | Yamamoto .................. | 188/2 D |
| 4,886,146 A | * | 12/1989 | Copp ........................ | 188/2 D |
| 4,930,605 A | * | 6/1990 | Boyer et al. ................. | 188/2 D |
| 4,955,458 A | * | 9/1990 | Shellhause .................. | 188/2 D |
| 5,002,159 A | * | 3/1991 | Brix et al. ................... | 188/2 D |
| 5,092,428 A | * | 3/1992 | Kobayashi et al. ..... | 188/106 A |
| 5,142,935 A | * | 9/1992 | Carr ........................... | 74/502.6 |
| 5,311,793 A | * | 5/1994 | Panek et al. ............... | 74/502.6 |
| 5,706,914 A | * | 1/1998 | Goldstein ................... | 188/2 D |
| 5,720,367 A | * | 2/1998 | Evans ...................... | 188/79.64 |
| 5,819,887 A | * | 10/1998 | Asai et al. ..................... | 188/78 |
| 5,924,529 A | * | 7/1999 | Ikeda et al. ................. | 188/331 |
| 6,065,571 A | * | 5/2000 | Ikeda ....................... | 188/79.61 |
| 6,105,732 A | * | 8/2000 | Venetos ..................... | 188/2 D |
| 6,206,148 B1 | * | 3/2001 | Capek et al. ............ | 188/79.51 |
| 6,230,853 B1 | * | 5/2001 | Hasegawa .................... | 188/78 |

* cited by examiner

*Primary Examiner*—Christopher P. Schwartz
*Assistant Examiner*—Devon Kramer
(74) *Attorney, Agent, or Firm*—Paul E Milliken; Ray L Weber

(57) ABSTRACT

A parking brake actuating mechanism in which a first lever (11) acts on a first brake shoe web (13) and a second lever (15) pivoted on the first lever (11) acts on a second brake shoe web (17). The first lever (11) includes an actuating cable abutment formation (31') against which an actuating cable nipple (28) on the free end of a cable (25) is drawn to move the first lever to increase the effective length of the mechanism and hence move the associated brake shoes. The first lever (11) is of hollow form defining a guide passage (29) which directs the free end of the cable from an aperture (24) in the backplate (23) of the associated brake to a location adjacent the abutment formation (31') to enable the nipple (28) to be engaged with the formation (31'). A portion (11') of the first lever outside the guide passage (29) may guide the cable from the end of the passage towards the abutment formation (31'). The second lever may also be shaped (32) to assist in guiding the nipple (28) into engagement with the abutment formation (31') when the nipple emerges from the end of the passage (29).

6 Claims, 3 Drawing Sheets

PARKING BRAKE ACTUATING MECHANISM

FIELD OF THE INVENTION

This invention relates to parking brake actuating mechanisms and particularly to such mechanisms, hereinafter being referred to as of the kind specified, comprising a first lever having a first contact zone adapted to engage a first brake shoe portion, said first lever being pivotally connected with a second lever, the second lever having a second contact zone adapted to engage a second brake shoe portion, pivoting of the first lever relative to the second lever being arranged to increase the effective length of the mechanism between the contact portions thus moving the associated brake shoe portions apart to engage the parking brake.

BACKGROUND OF THE INVENTION

There is an increasing requirement in the industry to make the attachment of actuating cables to parking brake mechanisms a process which can be carried out on the vehicle assembly line without the need for the brake to be disassembled to give access to the internals of the parking brake actuating mechanism.

SUMMARY OF THE INVENTION

It is an object of the present invention to provide a parking brake actuating mechanism of the type specified in which the actuating cable can be engaged with the lever mechanism without requiring internal access to the associated drum brake.

Thus according to the present invention there is provided a parking brake actuating mechanism of the type specified in which the first lever includes an actuating cable abutment formation against which an actuating cable nipple on a free end of the cable is drawn to move the first lever hence operating the mechanism, the first lever also being of hollow form defining a guide passage through which the free end of the cable is directed from an aperture in the backplate of the associated brake to a location adjacent to the abutment formation to enable the nipple to be engaged with the formation The cross-section of the guide passage formed within the first lever may have a cross section part of which allows the passage therethrough of the cable nipple and part of which is narrow and will not allow passage of the nipple, one end of the narrow portion of the passage forming the abutment formation against which the nipple is drawn after the free end of the cable has emerged from the passage.

The passage is preferably curved and the cable is arranged to deflect the cable towards the narrow portion of the passage as it is inserted through the passage so that when the free end of the cable emerges from the passage the nipple thereon is deflected towards and engages the abutment formation formed by the end of the lever which contains the narrow portion of the passage.

The first lever may also include a portion outside the passage which guides the cable from the passage towards the abutment formation.

The second lever may also be shaped to assist in guiding the nipple into engagement with the abutment formation when the nipple emerges from the passage.

A parking brake actuating mechanism in accordance with the invention is suitable for use in a normal drum brake or in a so-called drum-in-disc brake. Also, the mechanism may be engaged between portions of separate brake shoes or between different portions of a single curved brake shoe.

BRIEF DESCRIPTION OF THE SEVERAL VIEWS OF THE DRAWINGS

One embodiment of the present invention will now be described with reference to the accompanying drawings in which.

DETAILED DESCRIPTION OF THE INVENTION

Figure 1:
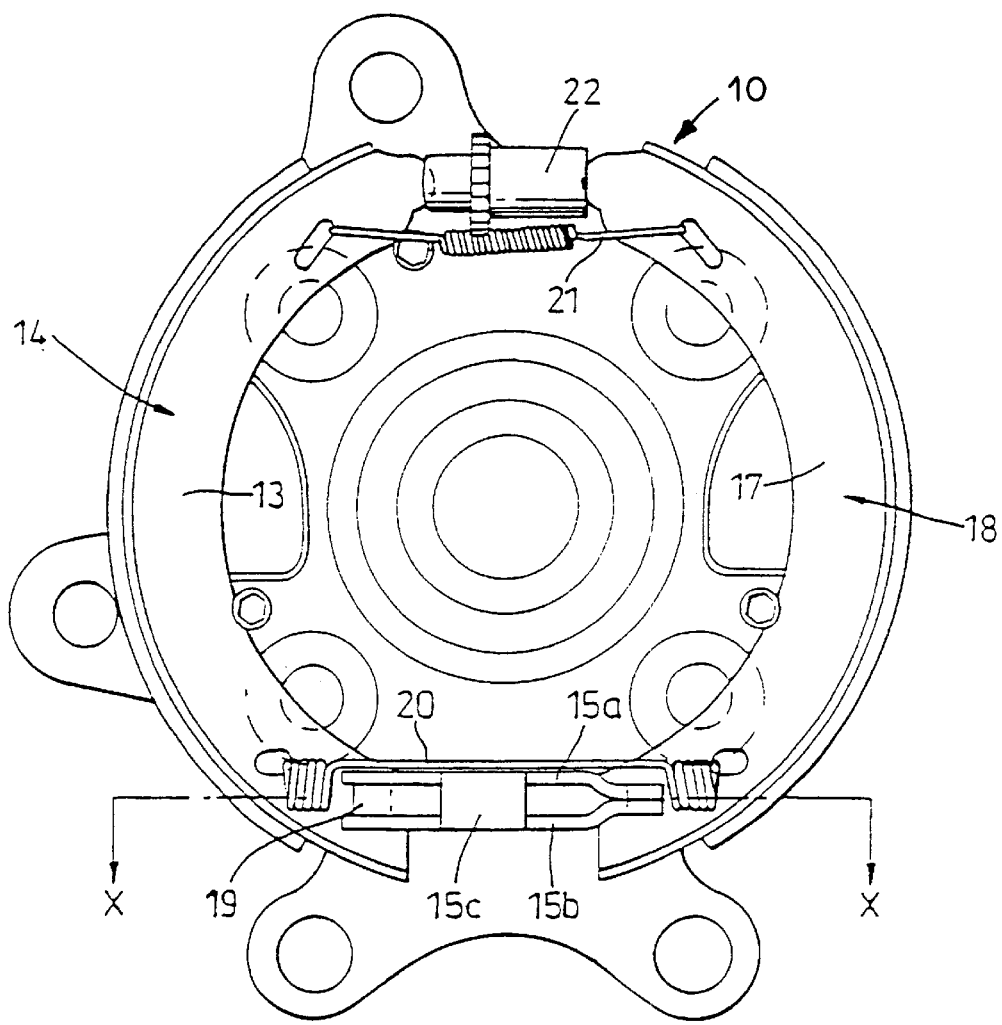
FIG. 1 shows a side view of part of a drum-in-disc parking brake actuating mechanism in accordance with the present invention.

Referring to the drawings the drum-in-disc parking brake mechanism 10 comprises a first lever 11 having a first contact zone 12 for engagement with a web 13 of an associated brake shoe 14 and a second lever 15 having a second contact surface 16 for engagement with the web 17 of a second brake shoe 18. The two levers 11 and 15 are pivotally interconnected at 19 so that, in conventional manner, pivoting of first lever in direction P results in an increase in the distance between the first and second contact zones 12 and 16 to force the brake shoes 14 and 18 apart causing them to engage with an associated drum (not shown). As is conventional the brake includes return springs 20 and 21 which acts between the shoes and an adjustment device 22 enabling the drum brake to be manually adjusted. Also second lever 15 has two limbs 15a and 15b joined by a bridging piece 15c.

Figure 4:
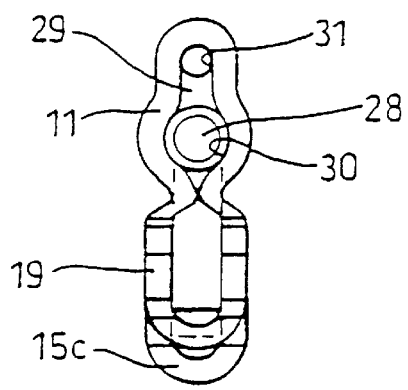
FIG. 4 shows a view through the two levers of the actuating mechanism.
Figure 2:
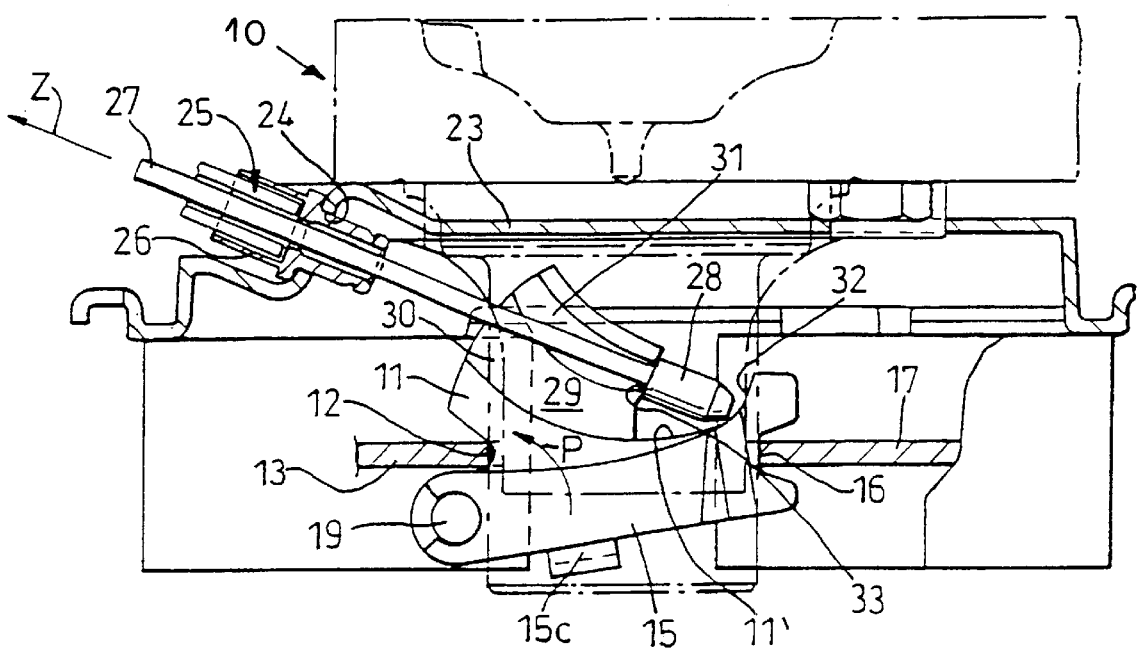
FIGS. 2 and 3 show a sections on line X—X of FIG. 1 with the actuating cable fully installed and partially installed respectively.
Figure 3:
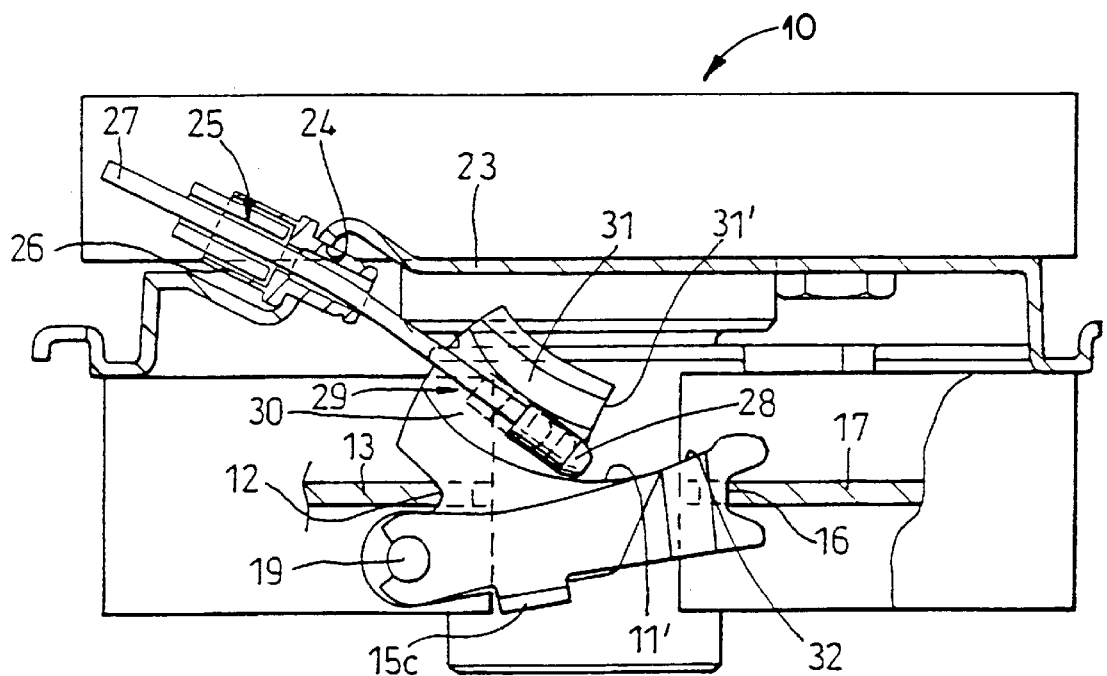
Figure 5:
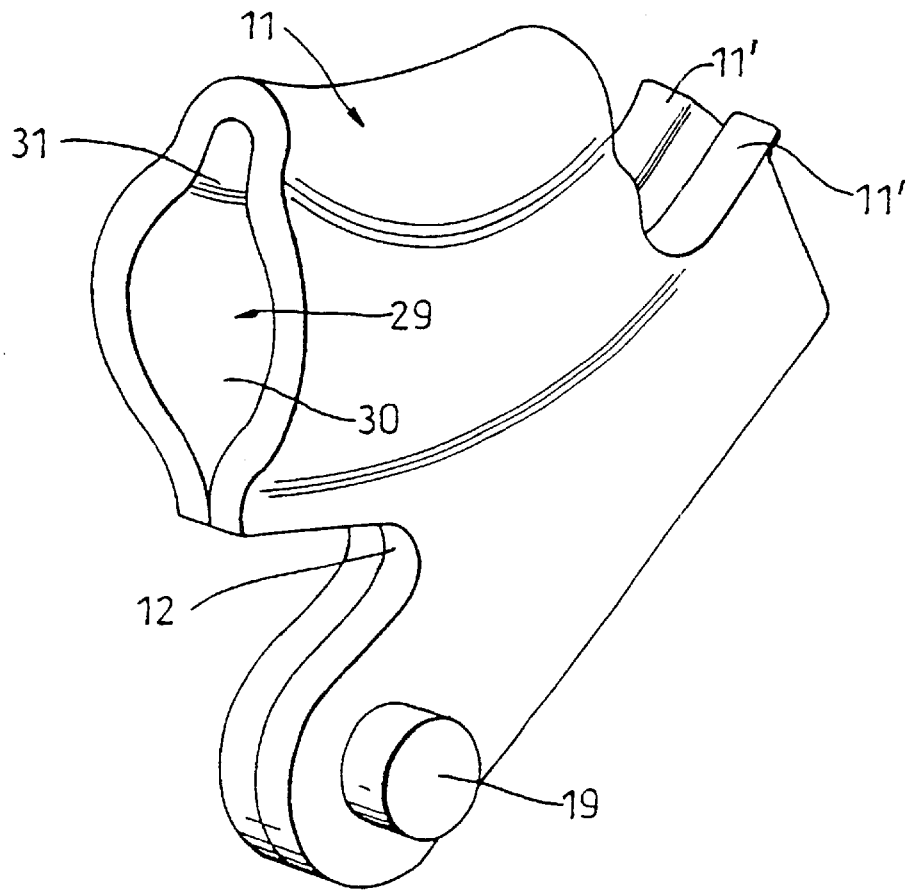
FIGS. 5 and 6 show respectively perspective views of the two levers of the actuation mechanism.
Figure 6:
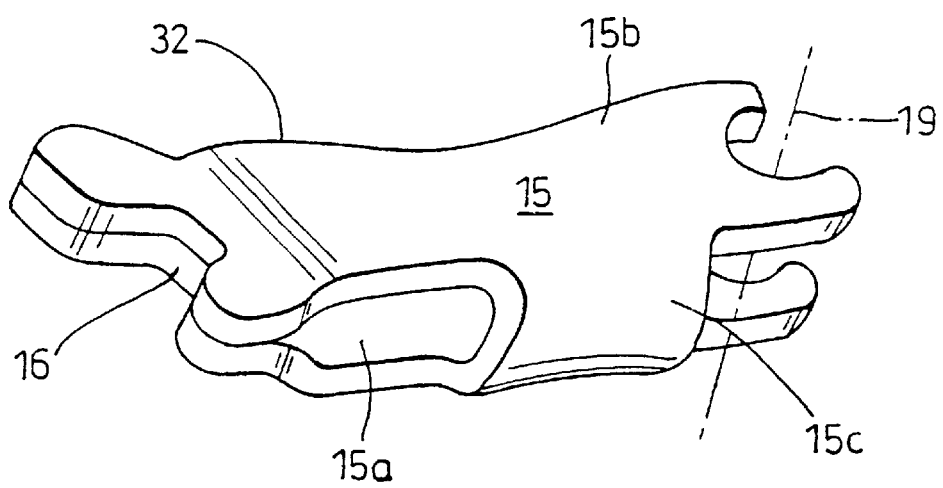

In accordance with the present invention the shoes 14 and 18 are mounted on a back plate 23 which includes an aperture 24 through which a parking brake actuating cable 25 extends. The cable has an outer sheath 26 which is gripped in aperture 24 and an inner member 27 whose free end terminates in a nipple 28. As can be seen from FIGS. 2 and 3, first lever 11 is of hollow pressed metal form and includes a longitudinally extending passage 29 whose cross section includes a wider portion 30 (see FIG. 4) through which the nipple 28 can pass and a narrower portion 31 through which the nipple cannot pass. As shown in FIG. 3, the inner 27 of the cable can be threaded through the wider portion 30 of passage 29. On emerging from the passage 29 the nipple is deflected both by the resilience of the cable inner itself, by guide surfaces 11' on the lever 11 and also by an adjacent edges 32 of the second lever 15 to assume the position shown in FIG. 2 in which the shoulder 33 of the nipple is drawn against the end 31' of the narrow portion 31 of the passage 29. Thus when the inner is drawn in direction Z of FIG. 2 the first lever is pivoted in direction P and hence the actuating mechanism is operated. If desired the guide surface provided by the edge 32 of lever 15 can be dispensed with.

Thus the present invention provides a parking brake actuating mechanism in which the cable can be engaged with the mechanism without requiring internal access to the brake using the integral guide built into the first lever. The guide provided in the first lever can be supplemented by additional guide surfaces 32 provided on the second lever 15 as described above.

The present invention is applicable not only to the drum-in-disc arrangement described above but to a conventional drum brake and also not only to a drum brake using two brake shoes but to a brake using a single curved shoe between the free ends of which the expanded mechanism is positioned.

What is claimed is:

1. A parking brake actuating mechanism comprising a first lever having a first contact zone adapted to engage a first brake shoe portion, said first lever being pivotally connected with a second lever, the second lever having a second contact zone adapted to engage a second brake shoe portion, pivoting of the first lever relative to the second lever being arranged to increase the effective length of the mechanism between the contact portions thus moving the associated brake shoe portions apart to engage the parking brake, the first lever including an actuating cable abutment formation against which an actuating cable nipple on a free end of the cable is drawn to move the first lever hence operating the mechanism, the first lever also being of hollow form and including a generally longitudinally extending tubular portion defining a guide tube through which the free end of the cable is directed from an aperture in a backplate of the associated brake to a location adjacent to the abutment formation to enable the nipple to be engaged with the formation.

2. A mechanism according to claim 1 in which the tubular portion of the first lever which defines the guide tube has a cross section part of which allows the passage therethrough of the cable nipple and part of which is narrow and will not allow passage of the nipple, one end of the narrow portion of the guide tube forming the abutment formation against which the nipple is drawn after the free end of the cable has emerged from the tube.

3. A mechanism according to claim 2 in which the guide tube is curved and the cable is arranged to deflect the cable towards the narrow portion of the tube as it is inserted through the tube so that when the free end of the cable emerges from the tube the nipple thereon is deflected towards and engages the abutment formation formed by the end of the lever which contains the narrow portion of the tube.

4. A mechanism according to claim 2 in which the first lever also includes a portion outside the tube which guides the cable from the passage towards the abutment formation.

5. A mechanism according to claim 2 in which the second lever is also shaped to assist in guiding the nipple into engagement with the abutment formation when the nipple emerges from the tube.

6. A drum brake including a parking brake actuating mechanism according to claim 1.

* * * * *